(No Model.)

F. McCULLOUGH.
COTTON CHOPPER.

No. 603,963. Patented May 10, 1898.

Witnesses
G. Chas Conner.
Alex. J. Wedderburn Jr.

Inventor
Frank McCullough.
By John Wedderburn
Attorney

UNITED STATES PATENT OFFICE.

FRANK McCULLOUGH, OF MOOREVILLE, TEXAS.

COTTON-CHOPPER.

SPECIFICATION forming part of Letters Patent No. 603,963, dated May 10, 1898.

Application filed May 25, 1897. Serial No. 638,034. (No model.)

*To all whom it may concern:*

Be it known that I, FRANK MCCULLOUGH, of Mooreville, in the county of Falls and State of Texas, have invented certain new and useful Improvements in Cotton-Choppers; and I do hereby declare the following to be a full, clear, and exact description of the invention, such as will enable others skilled in the art to which it appertains to make and use the same.

My invention relates to improvements in cotton-choppers, and has for its object to provide an improved construction of device of this character adapted for attachment to the tongue of the cultivator, whereby the cotton may first be chopped and thinned and the field plowed in rear thereof at one operation.

With these and other objects in view the invention consists in the novel constructions and combinations of parts hereinafter more fully described, and specifically set forth in the appended claims.

Figure 1:
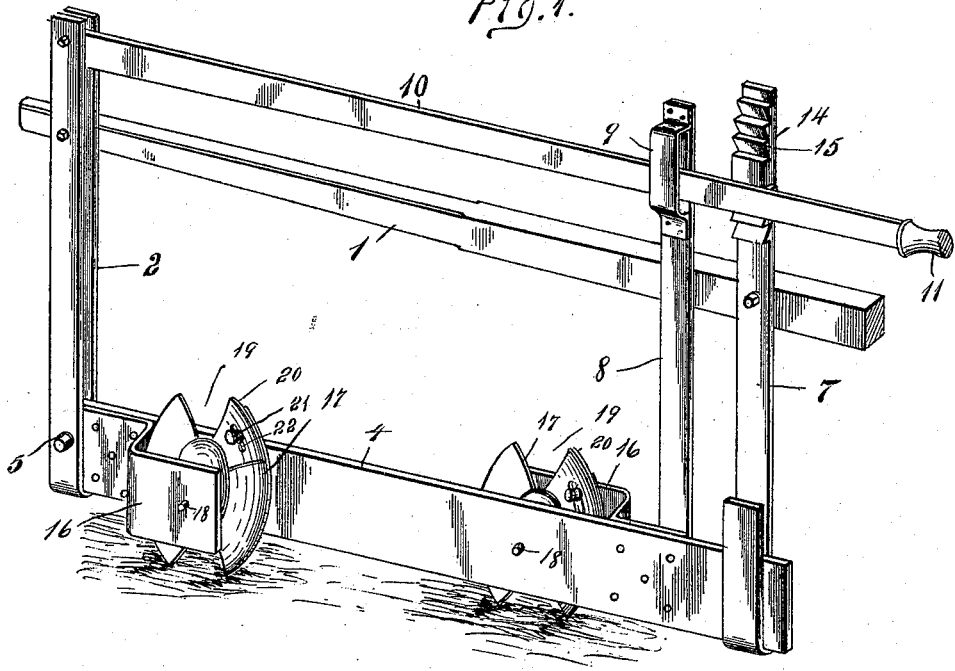
Figure 2:
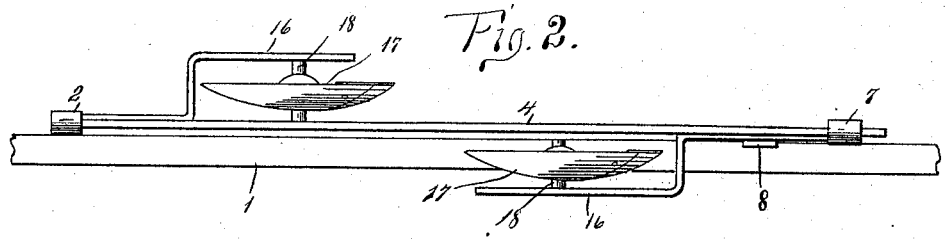
Figure 3:
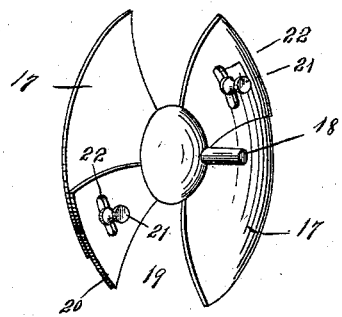

In the accompanying drawings, illustrating the invention, Figure 1 is a perspective view of the improved cotton-chopper attachment. Fig. 2 is a top plan view of the same. Fig. 3 is a detail perspective view of one of the chopping-hoes.

Referring now more particularly to the drawings, the numeral 1 represents a longitudinally-extending main connecting-bar, which is pivoted at its front end to a standard 2, and 4 a hoe-carrier bar pivoted to the lower end of the said standard at 5 and extending parallel with the said connecting-bar, as shown. The rear end of the hoe-carrier bar is adapted to fit and be retained within a loop formed by bending the lower end of the rear standard 7 upward, as shown, the said rear standard being connected to the said main connecting-bar adjoining the rear end of the latter. In practice the standards 2 7 are bolted to the cultivator-frame in front of the plows or cultivator-teeth.

A lifting-bar 8 is connected with the hoe-carrier bar adjoining the rear end thereof and is formed at its upper end with a guide-socket 9. An adjusting-lever 10 is pivoted to the upper end of the front standard 2 and occupies the said guide-socket in the lifting-bar, and its inner or rear end 11, constituting the handle portion thereof, projects beyond the end of the main connecting-bar 1, so that when the device is attached to the cultivator the lever will have position where the operator may give his attention to both the cotton-chopper and the cultivator. The upper end of the standard 7 is provided on one side with a rack-bar 14, having rack-teeth 15, with which the handle end of the lever is adapted to engage to hold it in a desired position. By means of the latter the hoe-carrier bar may be raised or depressed, as desired, to regulate the depth of penetration of the hoes.

The hoe-carrier bar is provided at opposite sides thereof with bearing extensions 16, arranged on opposite ends of the bar and projecting in reverse directions. A chopping-hoe 17 is mounted on a spindle 18, having bearing in each bearing extension and the hoe-carrier bar. Each hoe consists of a concave disk provided at opposite sides thereof with radial slots 19. A cutting-blade 20 is connected by means of a set-screw 21 with the hoe-disk at one side of each slotted portion thereof, said set-screw being adjustable in a slot 22 therein.

The radial slots and adjustable blades determine the amount of cotton chopped or thinned.

In operation the disks of the hoes roll along the row of cotton and, being slightly flared or inclined, cuts the ground like the disks of a rotary harrow.

From the above description, taken in connection with the accompanying drawings, the operation of the device will be clearly understood.

Having thus described my invention, what I claim as new, and desire to secure by Letters Patent, is—

1. In cotton-choppers, the combination of a main bar or beam, a front standard, a hoe-carrier bar pivoted to the lower end of said standard and provided with bearing extensions having position on opposite sides thereof, a cotton-chopping hoe revoluble between the carrier-bar and each of said bearing extensions, a rear standard connected with the rear end of the main connecting-bar and provided with a loop-shaped retaining end adapted to receive the rear end of the hoe-carrying bar and provided at its upper end with a rack, and a lever pivoted to the upper end of the front standard and having its rear end adapted to engage with the said rack, substantially as described.

2. In a cotton-cultivator, the pivoted and adjustable hoe-bar provided with bearing extensions on its opposite sides, in combination with chopping-hoe disks journaled in said bar and bearing extensions provided with radial slots or openings, and cutting-blades adjustable in said slots, substantially as described.

In testimony whereof I have signed this specification in the presence of two subscribing witnesses.

FRANK McCULLOUGH.

Witnesses:
E. C. McCULLOUGH,
J. HENRY GRAVES.